US006997295B2

(12) United States Patent
Pederson et al.

(10) Patent No.: US 6,997,295 B2
(45) Date of Patent: Feb. 14, 2006

(54) CLUTCH HAVING ELEMENTS CAPABLE OF INDEPENDENT OPERATION

(76) Inventors: Jack E. Pederson, 1722 Wildwood Trail, Saline, MI (US) 48197; Duane A. Bacon, 9038 Pheasant Ridge Ct., Saline, MI (US) 48176; Alfred J. Chiesa, 31222 Country Way, Farmington Hills, MI (US) 48331

( * ) Notice: Subject to any disclaimer, the term of this patent is extended or adjusted under 35 U.S.C. 154(b) by 149 days.

(21) Appl. No.: 10/188,928

(22) Filed: Jul. 3, 2002

(65) Prior Publication Data

US 2004/0003976 A1 Jan. 8, 2004

(51) Int. Cl.
*F16D 43/00* (2006.01)

(52) U.S. Cl. .................................... 192/41 A; 192/45.1
(58) Field of Classification Search ................ 192/45.1, 192/41 A, 43.1, 44, 45
See application file for complete search history.

(56) References Cited

U.S. PATENT DOCUMENTS

| | | | | |
|---|---|---|---|---|
| 2,901,072 A | | 8/1959 | Maurer et al. ............. | 192/45.1 |
| 3,019,873 A | * | 2/1962 | Ferris et al. ............... | 192/45.1 |
| 3,087,590 A | | 4/1963 | Gorsky ........................ | 192/45 |
| 3,279,571 A | | 10/1966 | Wassilieff .................... | 192/38 |
| 3,651,908 A | | 3/1972 | Oldfield ...................... | 192/45.1 |
| 3,819,019 A | | 6/1974 | Timtner ....................... | 192/41 |
| 3,937,310 A | | 2/1976 | Oldfield ..................... | 192/41 A |
| 3,952,849 A | | 4/1976 | Brownhill et al. ......... | 192/41 A |
| RE29,985 E | | 5/1979 | Brownhill et al. ......... | 192/41 A |
| 4,162,000 A | | 7/1979 | Zlotek .......................... | 192/41 |
| 4,880,093 A | | 11/1989 | Message ..................... | 192/45.1 |
| 5,070,977 A | | 12/1991 | Lederman .................... | 192/45 |
| 5,125,487 A | | 6/1992 | Hodge ....................... | 192/3.34 |
| 5,482,144 A | | 1/1996 | Vranish .......................... | 188/6 |
| 5,595,272 A | | 1/1997 | Zhou ............................ | 192/45 |
| 5,765,670 A | | 6/1998 | Fujiwara et al. ........... | 192/45.1 |
| 5,799,764 A | | 9/1998 | Muramatsu et al. ....... | 192/41.5 |
| 5,819,899 A | | 10/1998 | Iga et al. .................... | 192/45.1 |
| 5,918,461 A | | 7/1999 | Bacon ........................ | 60/343 |
| 5,947,245 A | | 9/1999 | Costin et al. ................ | 192/46 |
| 5,960,917 A | | 10/1999 | Still .......................... | 192/45.1 |
| 5,967,267 A | | 10/1999 | Vranish ..................... | 188/82.8 |
| 5,971,122 A | | 10/1999 | Costin et al. ................ | 192/46 |
| 6,044,947 A | | 4/2000 | Kimoshita .................. | 192/45.1 |
| 6,056,222 A | | 5/2000 | Hitomi ...................... | 242/247 |
| 6,059,084 A | | 5/2000 | Still .......................... | 192/45.1 |
| 6,092,635 A | | 7/2000 | McCarthy et al. ........... | 192/45 |
| 6,092,636 A | | 7/2000 | Muramatsu ................ | 192/53.1 |
| 6,095,693 A | | 8/2000 | Fujiwara ..................... | 384/625 |
| 6,109,409 A | | 8/2000 | Creech ...................... | 192/45.1 |
| 6,116,024 A | | 9/2000 | Rottino ....................... | 60/345 |
| 6,119,838 A | | 9/2000 | Igari et al. ................. | 192/45.1 |
| 6,125,979 A | | 10/2000 | Costin et al. ................ | 192/46 |
| 6,138,803 A | | 10/2000 | Muramatsu et al. ...... | 192/41 A |
| 6,167,998 B1 | | 1/2001 | Kinoshita .................. | 192/45.1 |
| 6,209,697 B1 | | 4/2001 | Austin ........................ | 192/45 |
| 6,220,414 B1 | | 4/2001 | Nagaya et al. ............. | 192/45.1 |
| 2002/0153217 A1 | | 10/2002 | Sato ........................... | 192/45.1 |

OTHER PUBLICATIONS

2000 SAE Handbook, vol. 2 Parts & Components and On–Highway Vehicles (Part 1)Standards Development Program, 2000, Society of Automotive Engineers, Inc., 5 pages.
"One–Way Clutch Design Guide Types, Selection, Applications", Spring/Brummer Division, 1978, Introduction to One Way Clutches, 1–34.
Cummings, H.S. Jr., "Roller and Cam Clutches: How and Where They Work", *PTD*, Mar. 1971, 66–69.
Ferris, E.A. "Automotive Sprag Clutches–Design And Application", *Society of Automotive Engineers, Inc.*, Spring Division Borg–Warner Corp., 1–21.
Ferris, E.A., "Automotive Sprag Clutches–Current Design and Application", Spring Division., Borg–Warner Corp., 6–16.
Merrell, R.L. et al., "Roller One–Way Clutches for Today's Passenger Car Automatic Transmissions", New Departure––Hyatt Bearings Div., General Motors Corp., Chapter 4, 27–39.
Rusnack, J.P. et al., "Higher Speeds for Sprag Clutches", *Machine Design*, 1982, 111–114.

Sauzedde, R.E. et al., "Design Roller One–Way Clutches in Current Passenger Car Automatic Transmissions", New Departure Division., General Motors Corp., 1971, 3, 17–26.

Zlotek, T.F. "Overrunning Sprag Ani Roller Clutches Solve-Diverse Problems", *Design News*, 1985, 66–72.

\* cited by examiner

*Primary Examiner*—Saul Rodriguez
(74) *Attorney, Agent, or Firm*—Woodcock Washburn LLP

(57) ABSTRACT

A freewheeling clutch includes torque transmitting elements disposed between an inner race and an outer race. The elements include active surfaces that may be defined by an angularly variable radius of curvature that varies with respect to roll angle at an increasing rate, such as an equiangular spiral, to form a constant strut angle as the elements move between a freewheeling and an engaged position.

88 Claims, 14 Drawing Sheets

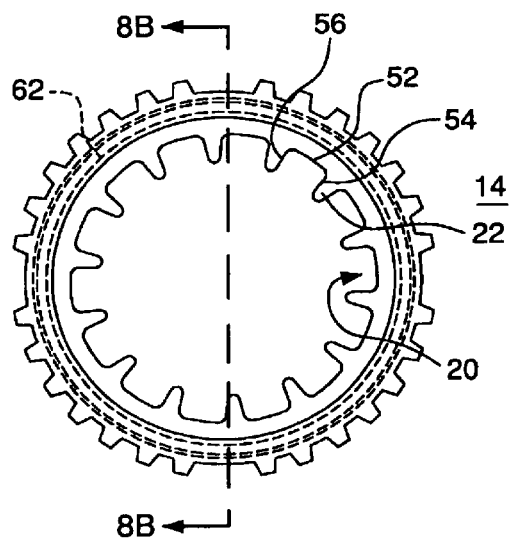
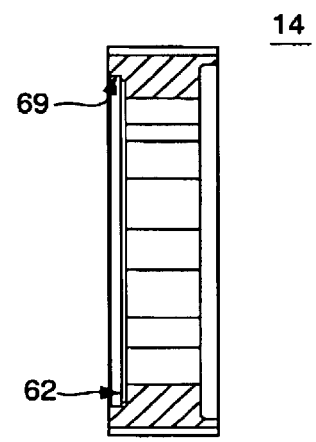
FIG. 8A  FIG. 8B
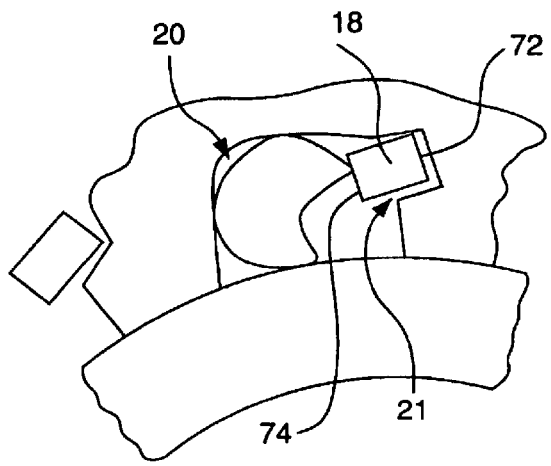
FIG. 15

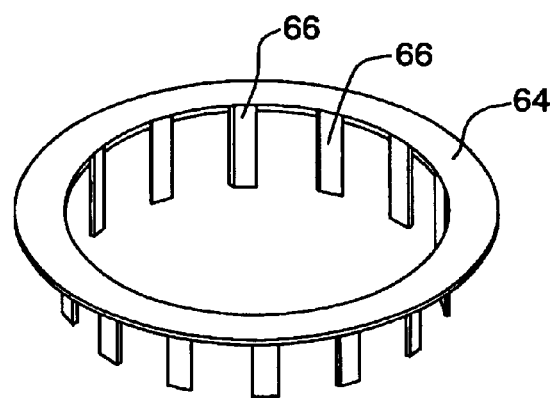
FIG. 11A
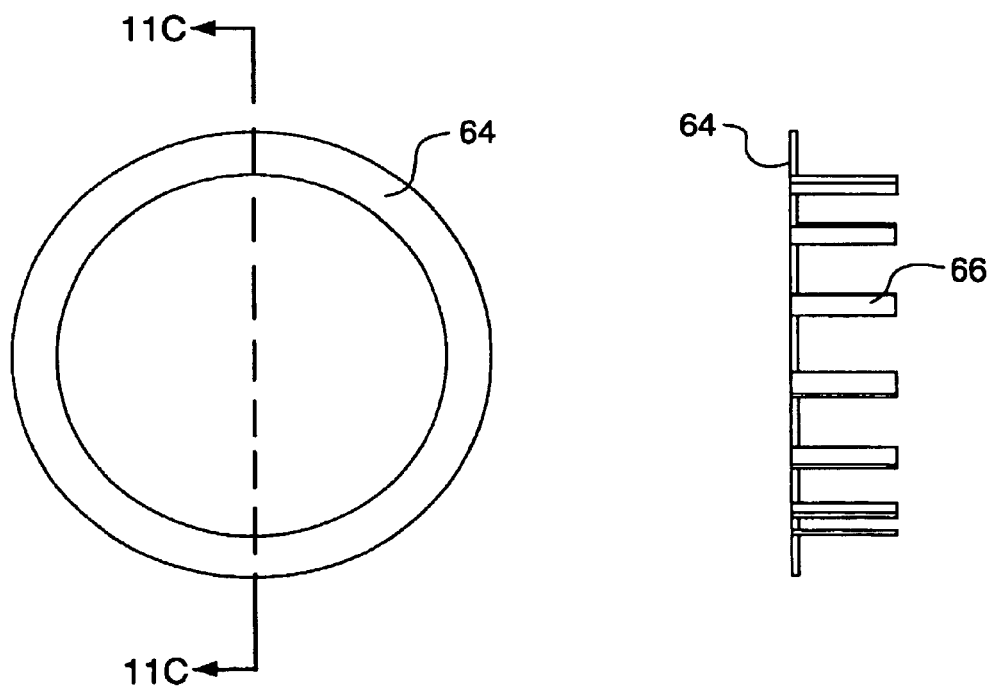
FIG. 11B  FIG. 11C

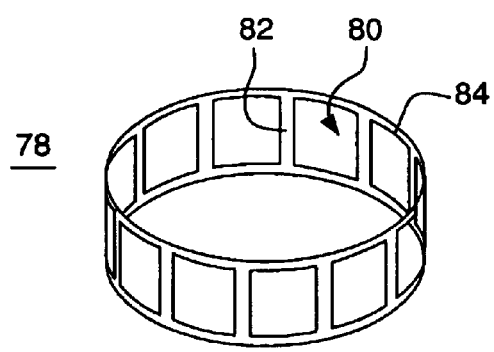
FIG. 14A
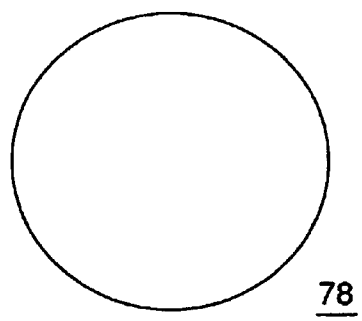 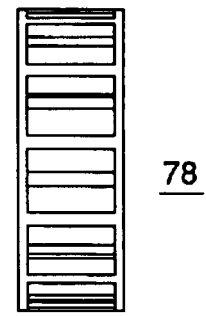
FIG. 14B         FIG. 14C

CLUTCH HAVING ELEMENTS CAPABLE OF INDEPENDENT OPERATION

BACKGROUND

The present invention relates to clutches, and more particularly to overrunning or one-way clutches having elements that are capable of independent operation.

Several types of clutches that transmit torque in one direction are well known. Such clutches typically have torque-transmitting elements—rollers, pawls, or sprags—disposed between an inner race and an outer race. For example, FIG. 1 (Prior Art) shows a roller clutch with pockets, which includes a cam surface, formed in the outer race to contain the rollers. FIG. 2 (Prior Art) shows a roller clutch similar to that shown in FIG. 1, but with a cage that retains the springs and rollers. The springs in the roller clutches shown in FIGS. 1 and 2 bias the rollers toward the narrow end (that is, the portion having the smallest radial spacing) of the pockets. The cam surface of a roller clutch may also be formed on the inner race (although such a configuration is not shown in the figures).

Whether the rollers are unphased (that is, operate independently of one another) as shown in FIGS. 1 and 2, or phased (that is, urged in unison by a cage into and out of a torque transmitting position), the rollers lodge between the inner and outer races at a narrow portion of the cam surface to transmit torque in only one relative rotational direction. When the inner and outer races are rotated in the relative opposite direction, the rollers disengage as the races rotate such that no torque, or a negligible amount of torque, is transmitted. As oriented in FIGS. 1 and 2, the outer race will transmit torque to the inner race while the outer race is driven counterclockwise, and will not transmit torque while the outer race is driven clockwise.

The terms "relative rotational direction," "rotational direction," and "torque transmitting direction" as employed in the specification and claims refer to relative rotation between the races without regard to whether the inner race or outer race is driven. Even in the unphased examples, the rollers engage substantially simultaneously. Such simultaneous engagement prevents undue stress in the rollers and localized portions of the races, and enables the clutch to transmit torque even if one or even a few of the rollers do not engage.

FIG. 3 (Prior Art) shows a schematic of a ratchet or pawl type clutch, in which a pawl pivots clear of a stop formed on the opposing race during rotation in one direction (that is, in the free-wheeling direction), but catches on the stop to transmit torque in the opposite direction (that is, the torque transmitting direction).

In addition to rollers and pawls, sprags are often employed to transmit torque between the inner and outer races of an overrunning clutch. Sprags are struts that have precisely machined cams at opposing ends that wedge between the races to transmit torque in one relative rotational direction, and that enable the races to freewheel while one race overruns the other or while the races turn in the opposite rotational direction. FIG. 4 (Prior Art) illustrates a single cage sprag clutch, and FIG. 5 (Prior Art) illustrates a double caged sprag clutch.

For a sprag clutch to function properly, the sprags typically must operate in phase, and therefore cages are typically required. Thus, referring to FIG. 5 to illustrate a phased configuration, a conventional sprag clutch 100 includes an inner race 102, an outer race 104, several sprags 106 disposed between the inner race 102 and outer race 104, and a spring 108 that urges the sprags 106 toward an engaged position such that the inner and outer contact surfaces of the sprag maintain contact with the inner and outer races, respectively. Clutch 100 also includes an inner cage 110a and an outer cage 110b, as well as an inner drag clip 112a and an outer drag clip 112b. The cages shown in FIG. 5 hold the sprags in position relative to the races and assure equal spacing and circumferential alignment of the sprags, as well as phased operation. Forms (not shown) placed on the side of the sprags may also be employed to phase their operation without the use of cages.

The paper entitled "Automotive Sprag Clutches—Design and Application," Society of Automotive Engineers No. 208A (E. A. Ferris) describes the importance of phased operation of sprags, and describes the high failure rate of non-phased clutches subjected to shock loads. In this regard, non-phased clutches are prone to failure at loads well below their static torque capacity. Roll over, which is associated with catastrophic clutch failure, occurs, for example, if a first sprag begins to engage prior to other sprags.

For both phased and unphased configurations, the strut angle is crucial to the design and operation of clutches, especially sprag clutches. The strut angle is formed between a line connecting the contact points of the sprag (or other torque transmitting element, such as a roller) at the cam and/or race and a radial line from the cam and/or race center to either contact point. FIG. 6 (Prior Art) illustrates the strut angle, and identifies the inner strut angle, which is formed at the sprag inner contact point, and the outer strut angle, which is formed at the sprag outer contact point. The strut angle determines the normal and tangential forces experienced by the clutch components while under load. The strut angle is also important for assuring appropriate clutch engagement, especially under adverse conditions such as cold weather, under shock loads, and the like.

In addition to more traditional manufacturing techniques for forming the above clutch components, powder metallurgy today is employed to form some components. Employing powder metallurgy for forming such components generally reduces cost, enhances design flexibility, and enhances ease of manufacturing. Powder metallurgy ("PM") techniques for forming clutch components typically include atomizing prealloyed steel or ferrous raw materials, blending the powder with components such as graphite, copper, nickel, or ferrophosphorus, injecting the mixture into a die, compacting and shaping the mixture by the application of pressure to form a compact, and ejecting the compact from the die.

The compact is then sintered wherein metallurgical bonds are developed under the influence of heat. The alloying and admixed elements enhance strength and other mechanical properties in the sintered part. According to the particular characteristics desired, secondary operations, such as sizing, coining, repressing, impregnation, infiltration, forging, machining, joining, etc., may be employed on the PM part. The term "net shape" or "net forging" will be employed to refer to a part to which no additional machining or related process are required to meet the desired tolerances common to the particular part. A term employed in the powder metallurgy field is near net PM forging, which indicates that only a relatively small amount of machining is typically required.

Each of the above clutch types, whether formed by a powder metallurgy process or other process, has drawbacks that limit its appeal. Roller clutches often are manufactured from wrought material or fully dense powder—that is, at an approximate minimum density of 7.8 g/cc. Hoop and contact stresses in a roller or sprag clutch typically require powder having a 7.80 g/cc density, which makes them more expensive than a lower density option. Moreover, for high torque ratings, roller clutches often require high alloy steels with fine surface finishes to withstand the sliding and rolling contact fatigue inherent in roller clutch design. Further, the number of rollers is constrained because a small roller diameter relative to the cam radius tends to promote cam fatigue.

Ratchet clutches in automotive applications often are manufactured using relatively high density single or double press powder metal processes, typically at approximately densities of 7.0 to 7.3 g/cc. This lower density often results in savings compared with fully dense roller and sprag clutch races. However, tight tolerances and large race diameters are sometimes required for high torque ratings, and such factors diminish or eliminate the cost savings over competing clutches. Further, because of the impact stress inherent in the ratchet design, the races manufactured out of 7.3 g/cc density pm are prone to fracture, and ratchet clutch's poorly distributed load bearing capability results in excessive wear on mating bearing surfaces.

Sprag clutch components often require tight tolerances to operate adequately. Sprags are often formed form cold-drawn wire and are machined or surface finished after hardening to achieve the precise dimensions necessary for sprags to operate acceptably and in unison. Thus, the machining and other processes that are required to produce parts within the particular tolerances often make sprag clutches more expensive than roller and pawl clutches.

It is generally a goal of the present invention to provide improved clutch and clutch components.

SUMMARY OF THE INVENTION

A clutch is provided that includes torque-transmitting elements disposed between an inner race and an outer race. Each one of the elements includes an inner active surface and an outer active surface capable of contacting the inner race and outer race, respectively, while the elements are in a torque transmitting orientation or position. The inner active surface is defined by an angularly variable radius that varies with respect to roll angle at a first rate. Similarly, the outer active surface is defined by another angularly variable radius that varies with respect to roll angle at a second rate.

The rate of change of the radius of the inner active surface (that is, the general shape of the curve) is not required to be the same as that for the outer active surface. Thus, the inner active surface may have a shape, in transverse cross section of the element, that is the mirror image of the shape of the outer active surface, or the inner active surface and outer active surface may have different shapes. The curves preferable have the same origin.

Preferably, equiangular spirals define the curves of the inner active surface and the outer active surface of the elements. Therefore, the equiangular spirals for the inner and outer active surfaces may have the constants of the same magnitude such that the shape of the curves are the same (or mirror images), or may have constants of dissimilar magnitudes. Further, the origins of the equiangular spirals of the inner and outer active surfaces may be the same or different.

The equiangular spirals or the angularly variable radii of curvature of the elements are capable of creating constant strut angles. In this regard, each one of the inner strut angle and the outer strut angle remains constant while the element moves between a disengaged position or freewheeling position to an engaged position. The inner strut angle may be the same or different than the outer strut angle. The present invention also encompasses only one of the inner active surface and the outer active surface having an angularly variable radius of curvature and/or forming an equiangular spiral.

For embodiments in which each element is disposed in a pocket, an intermediate surface of the element may be in contact with a rear wall of the pocket. A spring may be disposed between an opposing front wall of the pocket and the element to urge the element toward an engaged position. Preferably, each element includes a forwardly protruding extension to prevent the element from rotating out of spring engagement, or otherwise rotating out of position.

Embodiments of the present invention employ possible attributes of each of the three one way clutches described and combine them into one design. A roller clutch, for example, does not require phasing the way a sprag clutch does since it functions with a constant strut angle. Also, a pawl or ratchet clutch does not require phasing. An embodiment of a clutch according to an aspect of the present invention can function without means for phasing, which can serve to reduce costs associated with bearings, cages, or expensive machining operations that generally drive the cost of sprag clutches higher.

On the other hand, roller clutches cannot handle high relative velocities between the races since centrifugal forces lift the rollers off the inner race, causing the clutch to slip if engagement is attempted. Roller clutches once engaged experience sliding or skidding as the rollers attempt to take up race deflection. This sliding results in reduced contact fatigue endurance over a design using pure rolling. Ratchet clutch torque capacity using powder metal manufacturing methods is limited due to the reduced impact resistance of the manufacturing processes employed. Ratchet designs also introduce non-uniform loading on the race components causing increased wear.

Embodiments of the present invention may use full density PM for manufacturing processes, to produce relatively uniform loading of components under pure rolling conditions, while allowing non-phasing of the locking elements and high differential speeds between the races. In addition, equiangular spirals typically provide greater cam rise over a similarly sized sprag type element, allowing for more tolerance variation on the clutch components. Allowing more tolerance on race dimensions provides for less expensive manufacturing technologies to produce the clutch. The present invention is not limited to employing full density PM, nor to non-phasing elements or high differential speeds, as described more fully below.

BRIEF DESCRIPTION OF THE FIGURES

FIG. 8A is a side view of the outer race of the clutch shown in FIG. 7A;

FIG. 8B is an end view of the outer race shown in FIG. 8A;

FIG. 11A is a perspective view of a retainer of the clutch shown in FIG. 7A;

FIG. 11B is a side view of the retainer shown in FIG. 11A;

FIG. 11C is an end view of the retainer shown in FIG. 11A;

FIG. 14A is a perspective view of a retainer of the clutch shown in FIG. 13A;

FIG. 14B is a side view of the retainer shown in FIG. 14A;

FIG. 14C is an end view of the retainer shown in FIG. 14A;

FIG. 15 is an enlarged portion of another configuration of a portion of a clutch;

DESCRIPTION OF PREFERRED EMBODIMENTS

Figure 7A:
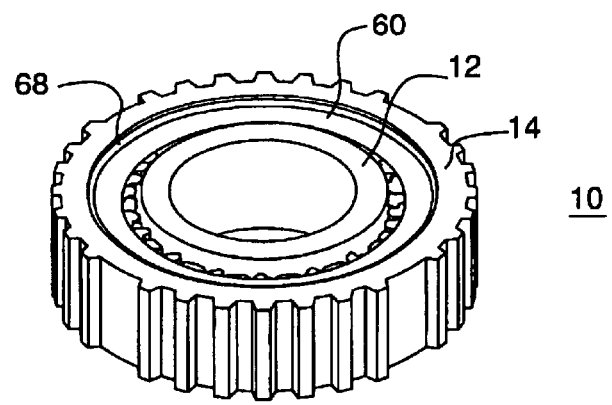
FIG. 7A is a perspective view of a clutch employing aspects of the present invention.
Figure 7B:
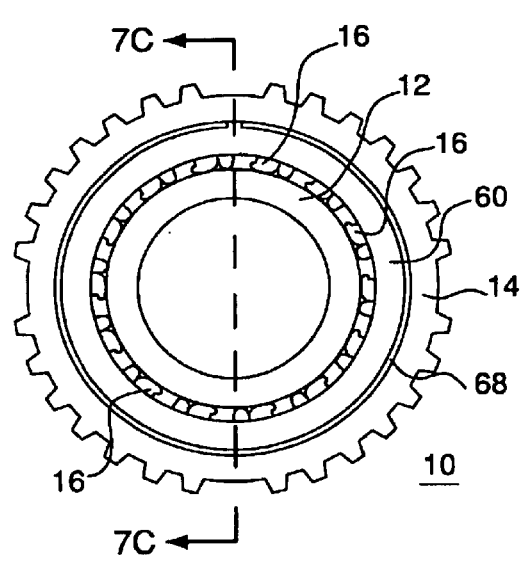
FIG. 7B is an elevation view of the clutch shown in FIG. 7A.
Figure 7C:
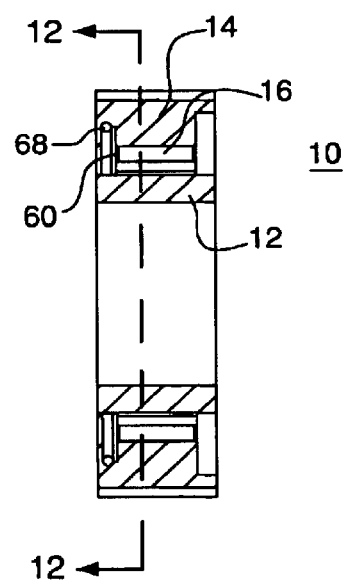
FIG. 7C is a cross sectional view of a portion of the clutch taken along line 7C—7C in FIG. 7B.

According to an aspect of the present invention, a clutch 10 includes an inner race 12, an outer race 14, and plural elements 16 disposed between inner race 12 and outer race 14. FIGS. 7A, 7B, and 7C show views of assembled clutch 10. Outer race 14, as best shown in FIGS. 8A and 8B, includes inwardly extending legs 22 that form pockets 20 therebetween. Thus, each pocket is formed by a main outer race surface 52, a pocket rear wall 54, and a pocket front wall 56. Legs 22 may have machined surfaces facing inner race 12 to promote concentricity of races 12 and 14.

Figure 9A:
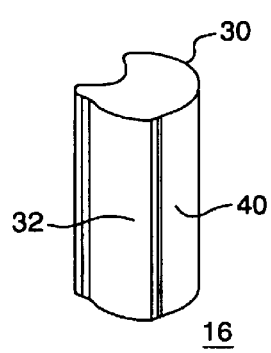
FIG. 9A is an enlarged perspective view of an element of the clutch shown in FIG. 7A.
Figure 10:
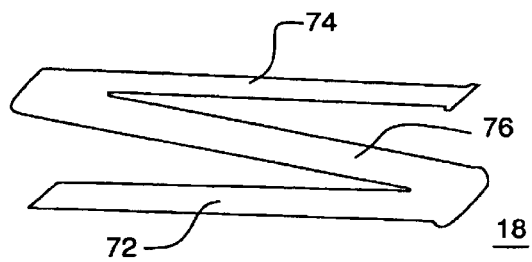
FIG. 10 is an enlarged view of a spring of the clutch shown in FIG. 7A.
Figure 9B:
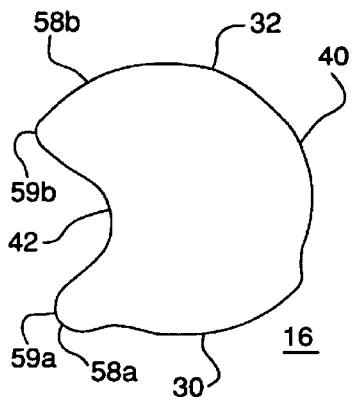
FIG. 9B is an enlarged end view of the element shown in FIG. 9A.
Figure 9C:
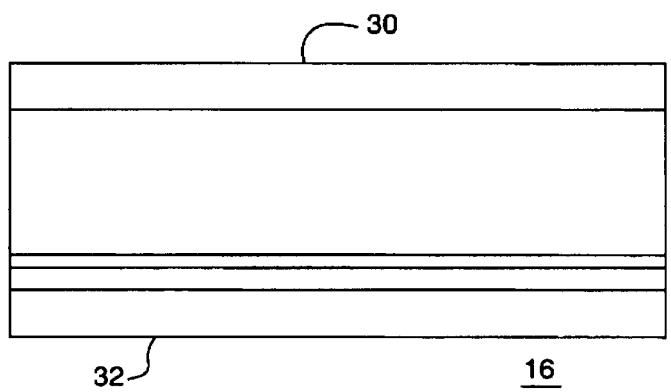
FIG. 9C is an side view of the element shown in FIG. 9B.

An element 16, as shown for example in FIGS. 9A, 9B, and 9C, and a spring 18, shown in FIG. 10, are disposed in each, or substantially each, pocket 16. Each element 16 includes an inner active surface 30 and an outer active surface 32, which are defined as the portions of elements 16 that contact the inner race 12 and outer race 14, respectively, during normal pivoting of the elements between the freewheeling position and the engaged position.

Figure 3:
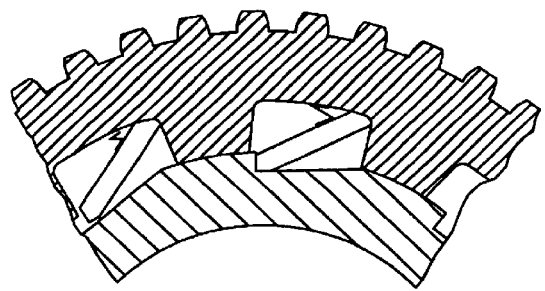
FIG. 3 (PRIOR ART) is a diagram of a ratchet or pawl clutch.
Figure 2:
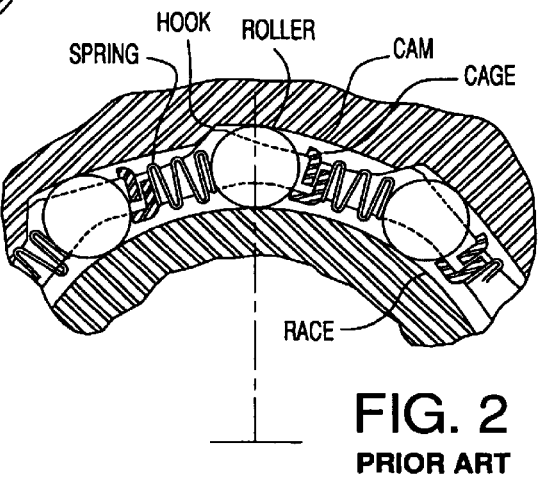
FIG. 2 (PRIOR ART) is a diagram of a roller clutch including a cage for urging the rollers to engage.
Figure 4:
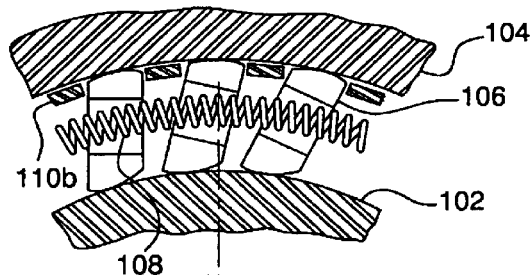
FIG. 4 (PRIOR ART) is a diagram of a phased sprag clutch employing a single cage.
Figure 1:
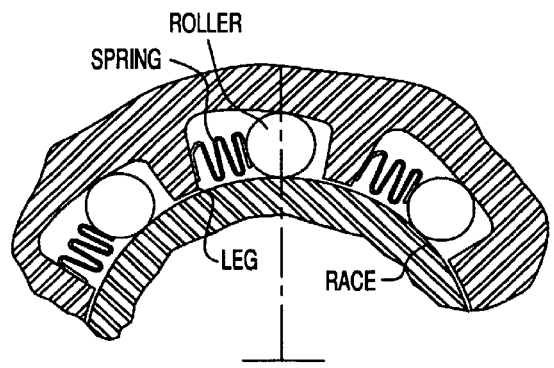
FIG. 1 (PRIOR ART) is a diagram of an unphased roller clutch.
Figure 5:
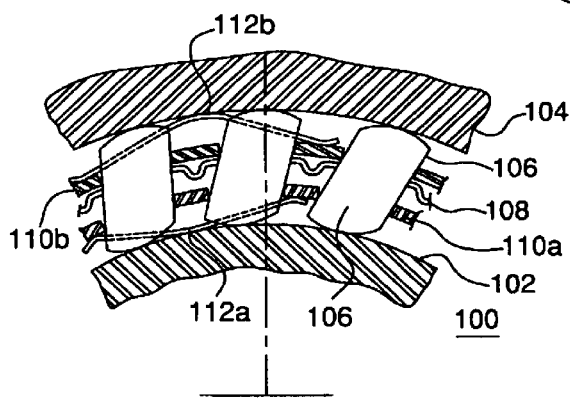
FIG. 5 (PRIOR ART) is a diagram of a phased sprag clutch employing a double cage.
Figure 6:
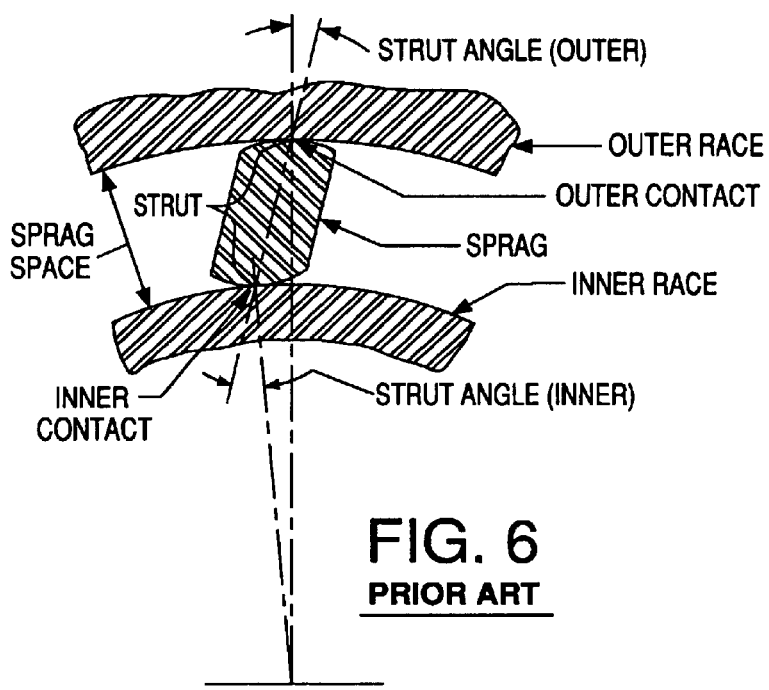
FIG. 6 (PRIOR ART) is a diagram illustrating parameters and terminology of clutch element design.
Figure 12:
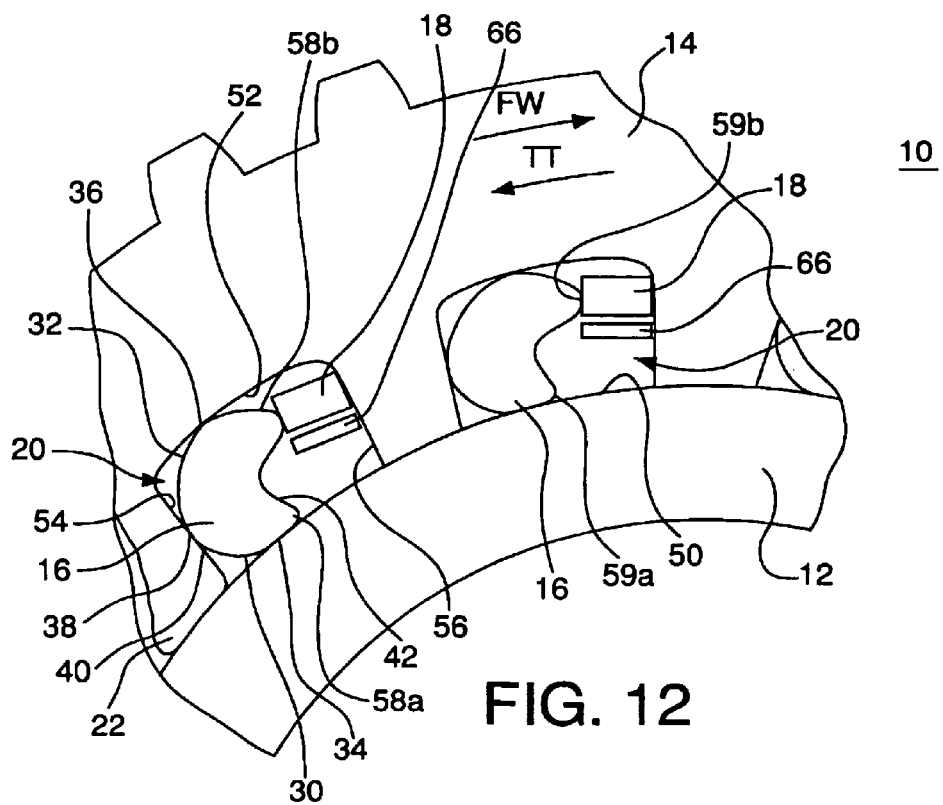
FIG. 12 is an enlarged schematic view of a portion of the clutch shown in FIG. 7A.

FIG. 12, which is an enlarged schematic view of a portion of clutch 10, shows elements 16 from the opposite view as shown in FIG. 7B, as indicated by lines 12—12 in FIG. 7C. As shown in FIG. 12, an inner contact point 34 and an outer contact point 36 are disposed on inner active surface 30 and on outer active surface 32, respectively. Contact points 34 and 36 are in contact with a main or contact surface 50 of inner race 12 and main outer race surface 52, respectively, at least while elements 16 are in a torque transmitting position as described more fully below. Because points 34 and 36 are actual points of contact, such points 34 and 36 may be defined on different portions of element 16 during operation.

An element rear surface 40 is disposed between inner active surface 30 and outer active surface 32. A rear contact point 38, disposed on element rear surface 40, is capable of contacting pocket rear wall 54. An element front portion or surface 42 is formed substantially opposite element rear surface 40, and preferably includes an inner projection 58*a* and an outer projection 58*b*. Inner and outer projections 58*a* and 58*b* may terminate in inner and outer apexes 59*a* and 59*b*, respectively. Projections 58*a* and 58*b*, which may be portions that deviate from the curves defining inner and outer active surfaces 30 and 32, respectively, or may merely be extensions thereof, inhibit or prevent the elements from rotating out of spring engagement.

Spring 18 is disposed between pocket front wall 56 and element front portion 42, and preferably urges against element outer apex 59*b* to urge element 16 counterclockwise (as oriented FIG. 12) toward its engaged or torque transmitting position. Spring 18 preferably includes a substantially flat front end 72 disposed against pocket front wall 56, a substantially flat rear end 74 disposed against element outer projection 58*a*, and one or more leaves 76 therebetween.

A retainer 60, which is shown in FIGS. 11A, 11B, and 11C, may be disposed on outer race 14 as shown in FIGS. 7A, 7B, and 7C. Retainer 60 preferably includes a substantially flat ring 64 from which plural fingers 66 protrude. Fingers 64 protrude into pockets 20 to position or retain springs 18 therein. A snap ring 68 preferably is employed to retain retainer 60 in a snap ring groove 69 that is disposed proximate retainer groove 62. Retainer 60 and snap ring 68 may be employed on either or both sides of outer race 14. As in conventional overrunning clutches, preferably, each side of pockets 20 includes some feature to limit the longitudinal movement of elements 16.

Figure 13A:
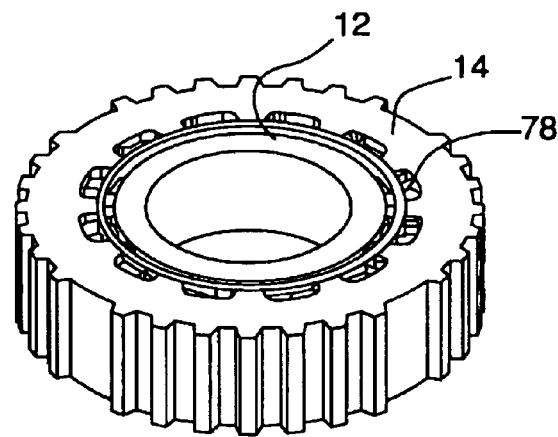
FIG. 13A is a perspective view of a clutch similar to that shown in FIG. 7A, except for some components changed therefrom.
Figure 13B:
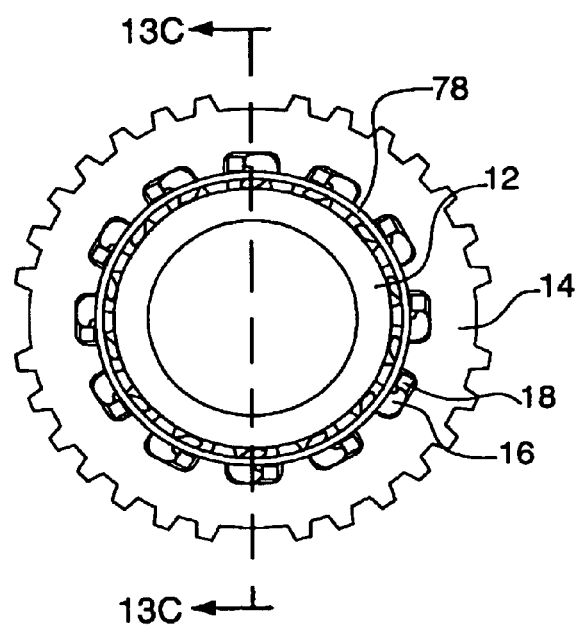
FIG. 13B is an elevation view of the clutch shown in FIG. 13A.
Figure 13C:
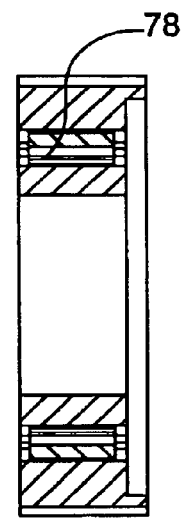
FIG. 13C is a cross sectional view of a portion of the clutch taken along line 13C—13C in FIG. 13B.

Springs 18 may be secured within pockets 20 by any suitable means. For example, springs 18 may be held in place by a cage 78, as shown in FIGS. 13A, 13B, and 13C. Cage 78 includes plural windows 80 that are formed by opposing circular rims 84 and ribs 82 disposed between opposing rims 84. Windows 80 enable legs 22 to be disposed therein, and ribs 82 retain springs 18, as described above with respect to fingers 66. Further, springs 18 may be disposed in a small spring pockets 21, which are extensions of, and in communication with, main pocket 20, as shown schematically in FIG. 15. In such an embodiment, first end 72 of each of the springs 18 may be disposed in spring pocket 21 such that the spring (that is, second end 74) protrudes into main pocket 20 and into contact with element 16.

Spring 18 urges against a position of element 16 so as to position element 16 such that three points of element 16 are in contact with races 12 and 14 and such that element 16 is pivoted until it spans the race height between inner and outer races 12 and 14. Spring 18 urges element 16 toward its engaged position such that inner active surface contact point 34 contacts main inner contact surface 50, outer active surface contact point 36 contacts main outer race surface 52, and rear contact point 38 contacts pocket rear wall 54. Thus, element 16 is in position to readily engage to its torque-transmitting position.

Even though it is an advantage that the elements described herein are capable of unphased operation, the present invention is not limited to such a configuration. Rather, it may be beneficial to provide a cage or ribbon to interconnect springs 18 or elements 16 for a variety of reasons, and the present invention encompasses such structure.

Elements 16 are configured to enable outer race 14 to freewheel with respect to inner race 12 while outer race 14 turns in a clockwise direction, which is indicated by the relative directional arrow FW in FIG. 12. Alternatively, while outer race 14 moves in a counterclockwise direction relative to inner race 12, which is indicated by the relative directional arrow TT in FIG. 12, element 16 is encouraged by frictional contact with inner race surface 50 and/or outer race surface 52 and by the force of spring 18 to move to a torque transmitting position in which element 16 is wedged between inner and outer race contact surfaces 50 and 52. It is understood that such movement refers to relative movement of the races, regardless of which (or both) race are physically rotating relative to a fixed point outside the clutch.

In the embodiment shown in FIG. 12, and as explained more fully below, element inner contact surface 30 is defined by a first radius of curvature having an angularly variable magnitude. Likewise, element outer contact surface 32 is defined by a second radius of curvature having an angularly variable magnitude. In fact, preferably the magnitude or length of the radius of curvature of inner active surface 30 varies with respect to roll angle at an increasing rate. Likewise, the magnitude or length of the radius of curvature of the outer active surface 32 varies—that is, increases, with respect to the roll angle, and may increase at an increasing rate. The rate of change of the radius of curvature is not required to be constant. A vector drawn perpendicular to a tangent at any point on curve of inner or outer active surface 30 or 32 may define the radius of curvature r-c. In a preferred embodiment, the magnitude of the angle between the radial vector and the radius of curvature remains constant. The term "roll angle" as used herein is the magnitude of pivoting of a surface of element 16 about the origin of the radial vectors as element 16 moves between its at-rest, disengaged position and its fully-engaged, torque transmitting position. Thus, as explained more fully below, the roll angle for an inner and/or outer active surface that is formed by an equiangular spiral is measured about the origin of the spiral. For other embodiments, the roll angle will be clear to persons familiar with over-running clutch configurations in view of the present disclosure.

Figure 16:
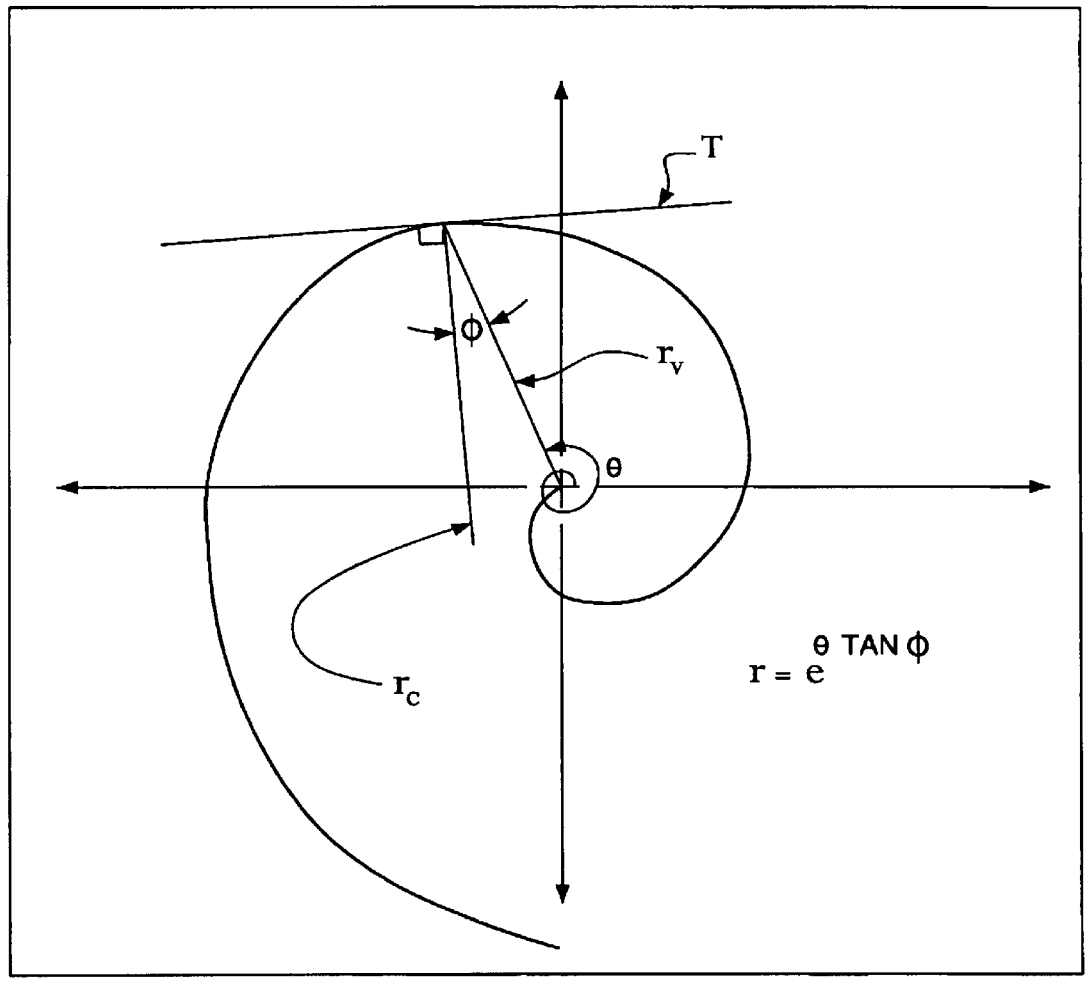
FIG. 16 is a diagram of an equiangular spiral.
Figure 17A:
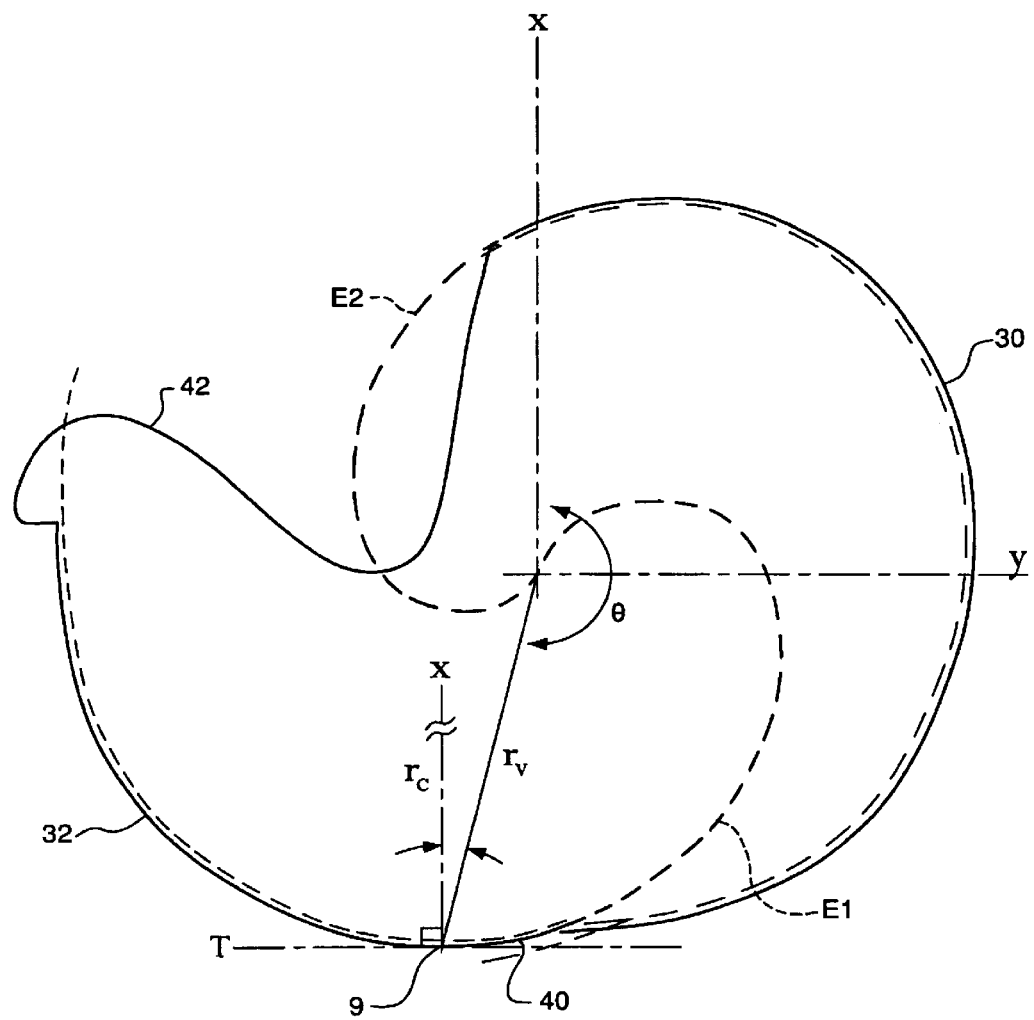
FIG. 17A is a diagram of a pair of equiangular spirals superimposed on an element, which is shown in phantom, according to an embodiment or aspect of the present invention.

The shape of the active surfaces 30 and 32 may be defined by equiangular spirals, an example of which is shown in FIG. 16. FIG. 17A shows a pair of equiangular spirals, which are indicated by reference numerals E1 and E2, superimposed over the shape of an element 16. An equiangular spiral is a shape in which, in polar coordinates, the radial vector r-v is a (increasing) function of the angle theta, which is the angle between the x-axis and the radial vector. The magnitude of radial vector r-v is measured from the origin. The equiangular spirals have the characteristic that for the angle formed between a radial vector r-v (that, is a line drawn from the origin O to any point P on the spiral curve) and the tangent T for any point P is constant.

The formula for equiangular spirals E1 and E2, in polar coordinates, is:

$$r_v = ae^{b\theta}$$

where $b = \tan(\phi)$ and where r-v is the magnitude of the radial vector from the origin O to point P on the curve; $\theta$ is the angle from the x-axis (and part of the definition of r-v), a is a constant; and $\phi$ is the angle formed between the radial vector r-v and the radius of curvature r-c. Angles $\theta$ and $\phi$ may have a different value on the inside of element 16 than on the outside of element 16.

Curve E1 may have components a and b that are the same as those for curve E2, or at are different from those of E2. Further, curves E1 and E2 may have the same orgin, or each curve E1 and E2 may have its own origin that is spaced apart for the other (the latter is not shown in the Figures). Preferably, curves E1 and E2 have the same positive direction for angle theta (that is, clockwise as oriented in FIG. 17A). Preferably all of actives surfaces 30 and 32 are formed by equiangular spirals, and the present invention encompasses elements in which only portions of the inner and outer active surfaces are formed by equiangular spirals, as well as embodiments in which active surfaces 30 and 32 are not formed by equiangular spirals but the elements provide the same function with respect to strut angle, as discribed herein. The subscripts i and o are employed herein to indicate that the variable refers to the inside and outside curves or surfaces of element 16, respectively.

Figure 18:
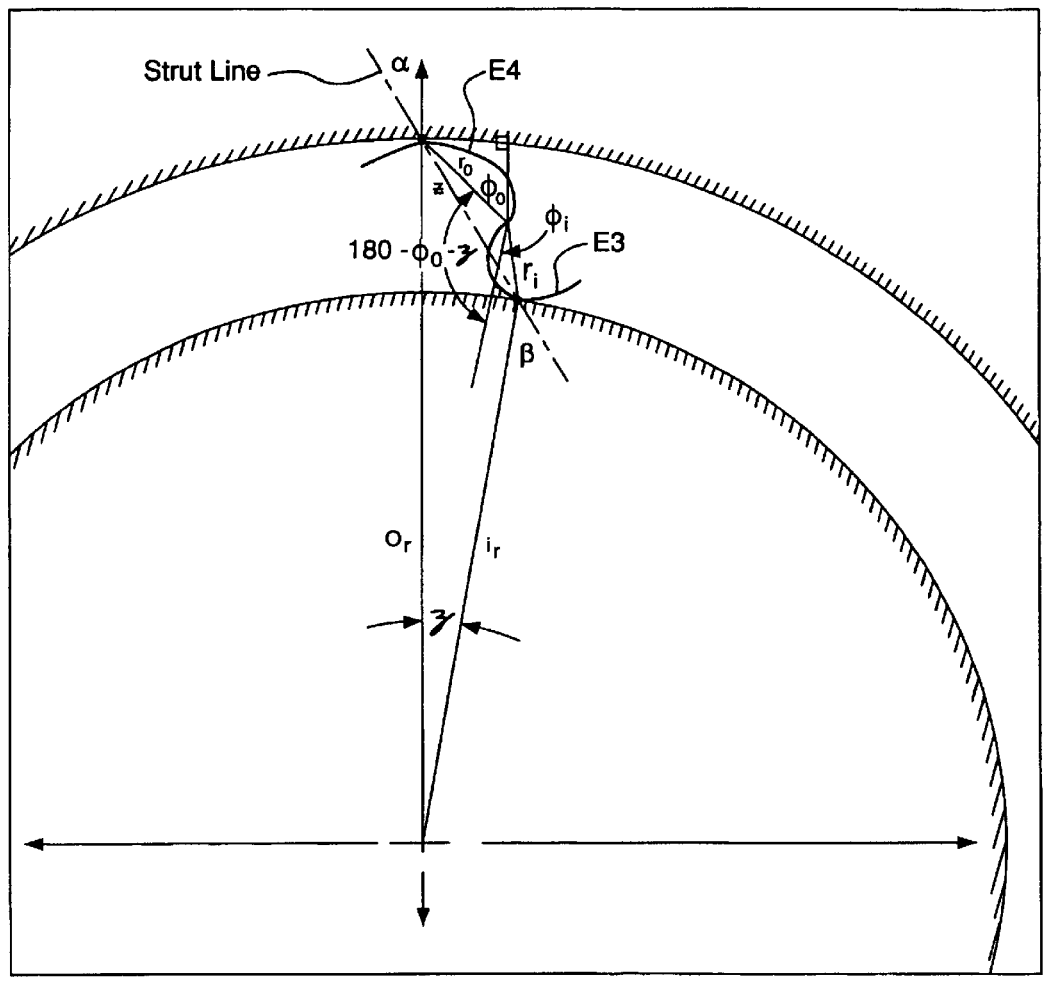
FIG. 18 is a diagram employed to explain the calculation of the strut angles.

Referring to FIG. 18 to illustrate the calculation of the strut angles, a pair of equiangular spirals E3 and E4 share the same origin between inner and outer races of defined diameters. To determine the strut angles, an imaginary element's position may be mathematically rotated about the center of the clutch 10, and a locking distance between the races z-races is calculated for each rotational position. The element itself may be mathematically rotated about its center, and the locking distance of the element z-element may be calculated for each rotational position. Locking will occur when z-races and z-element are equal. Z-races and z-element may be calculated from the following equations, which follow from the law of cosines:

$$Z_{races} = (O_r^2 + i_r^2 - 2O_r i_r \cos \xi)^{1/2}$$

$$Z_{element} = (R_o^2 + R_i^2 - 2R_o R_i \cos(180 - \phi_o + \phi_i - \xi))^{1/2}$$

where $$R_o = \exp(\theta_0 \tan \phi_o)$$

$$R_i = \exp(\theta_i \tan \phi_i)$$

$$\theta_i = (\theta_o = 180 - \epsilon - \phi_o - \xi)$$

where $\epsilon$ is the phase angle between the inner and outer spirals; $O_r$ is the magnitude of the vector from the center of the clutch 10 to the outer contact point 36; $i_r$ is the magnitude of the vector from the center of the clutch 10 to the inner contact point 36; $\xi$ is the angle formed between $O_r$ and $i_r$. Theta Once z-races is equal to z-element, the strut angles $\alpha$ and $\beta$ may be readily determined from the known geometry:

$$\alpha = \text{invcos}((Z^2 + O_r^2 - i_r^2)/(2ZO_r))$$

$$\beta = \alpha + \xi$$

where Z is the distance between inner contact point 34 and outer contact point 36.

For any diameter of inner race contact surface 50 and outer race main surface 52 (that is, for any radial space defined between the races), an angularly variable radius of curvature may be chosen for element inner and outer active surfaces 30 and 32 such that the inner and outer strut angles remain constant regardless of roll angle. In this regard, the inner strut angle and the outer strut angle remain constant while element 16 moves between its freewheeling (or at-rest), disengaged position and its fully-engaged, torque transmitting position.

Figure 20:
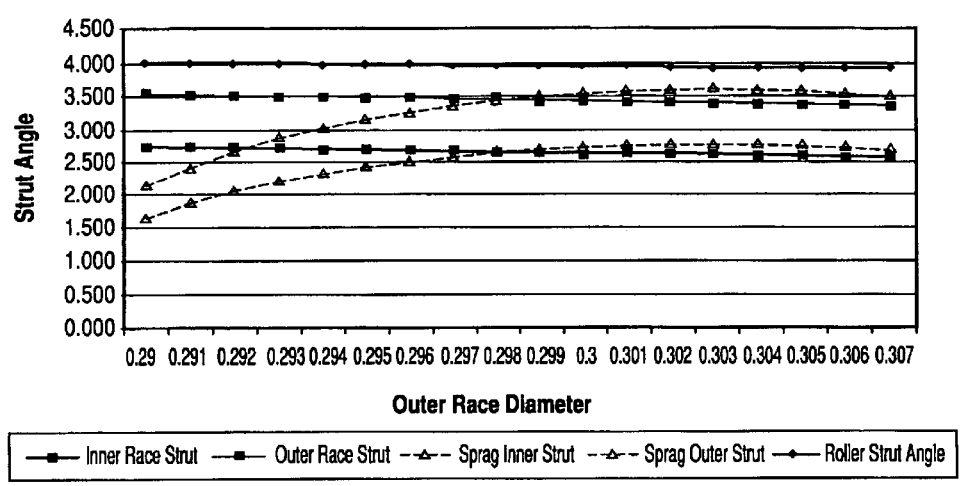
FIG. 20 is a graph reflecting strut angles.

Thus, the strut angles are constant over a given range of motion of elements 16, and the strut angles may be determined from the defined spiral and race geometries. For example, if the outer race size is increased while the inner race diameter is held constant, elements may be configured employing the principles described herein and the strut angles recalculated. FIG. 20 illustrates the substantially constant strut angle of elements 16 by comparing such strut angles for an increasing outer race diameter with strut angles of a roller clutch and a conventional sprag clutch while holding the inner race diameter constant.

The present invention does not require that the magnitude of the inner strut angle be equal to that of the outer strut angle. In fact, in practice the magnitudes will typically differ The actual magnitude of the strut angles may be chosen according to conventional clutch design parameters in light of the present disclosure, as will be understood by persons familiar with clutch design and technology. Maintaining such constant strut angles provides benefits including enhancing uniformity of element engagement for unphased elements, especially under adverse conditions such as cold weather, under shock loads, and the like, as well as minimizing hoop stresses and localized contact stresses, and other benefits, as will be understood by persons familiar with clutch design and technology in light of the present discussion.

Obtaining such benefits does not require the strut angles to be exactly uniform under all roll angles, and thus the term "constant strut angle" encompasses strut angles that vary to some degree. Further, maintaining a constant strut angle or a strut angle within a particular range is not essential to the present invention. The present invention also contemplates that the inner strut angles among the plural elements 16 may vary somewhat, and that the outer strut angles among the plural elements 16 will vary somewhat.

In this regard, each element 16 may maintain an inner strut angle that changes no more than about four degrees while the element moves between its freewheeling position and its engaged position. Each element 16 may also maintain an outer strut angle that changes no more than about four degrees while the element moves between its freewheeling and its engaged position. More preferably, strut angles that change no more than about two degrees, and even more preferably that change no more than about one degree may be employed. In an embodiment in which the races are formed of powder metallurgy within a tolerance of approximately +/−0.006 inches and the elements are formed of cold or hot extrusion, the inner strut angles have been shown to vary among the elements (that is, the strut angle varies from one element to another) by approximately 0.1 degrees, and the outer strut angles have been shown to vary among the elements by approximately 0.1 degrees. The present invention is not limited to any particular variation of strut angles among elements 16, unless expressly set forth in the claim.

Although the strut angles provided above may illustrate design guidelines, to the extent that such ranges are not recited in a particular claim, the present invention is not limited to the particular ranges disclosed, nor are the advantages referred to herein limited to such ranges. Further, the strut angle ranges may take into account component tolerances and deflection or deformation of the components under design and shock loads. For example, the claims that recite a particular range to which the strut angles are limited may be satisfied even if some of the strut angles of some of the elements fall outside of the claimed range because of dimensional variation of the parts, local load-induced component deflection, and like variables. The present invention does not require that all elements maintain a constant inner and outer strut angle.

Figure 17B:
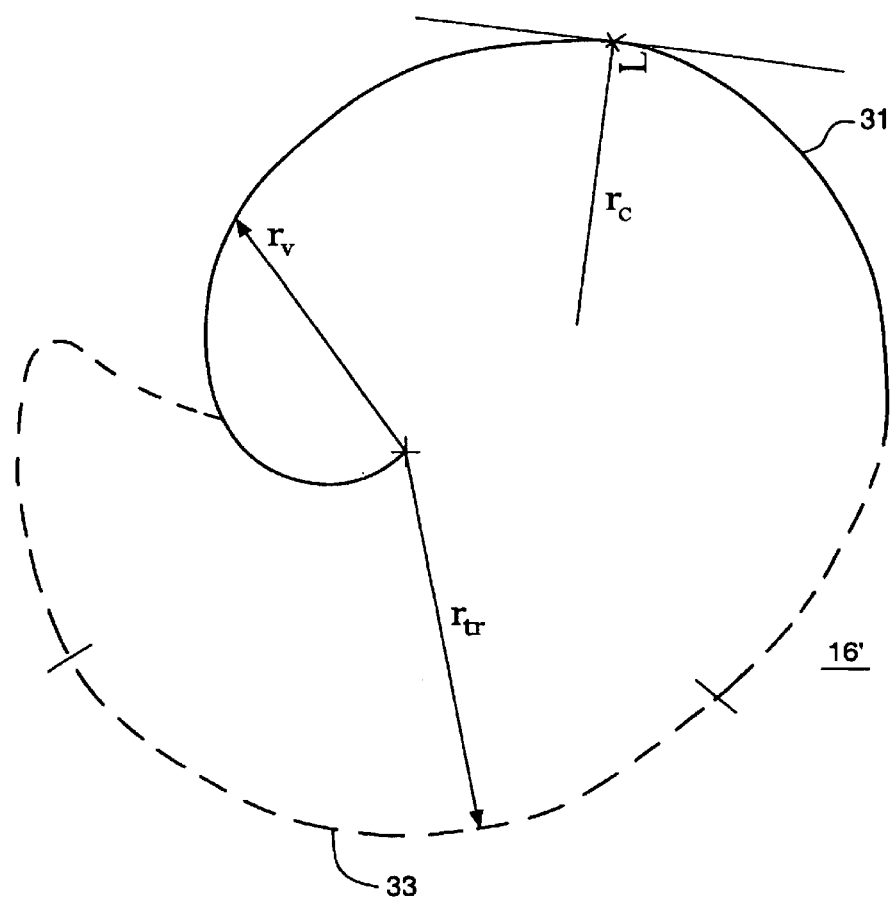
FIG. 17B is another diagram of other shapes capable of forming an element, according to another embodiment of the present invention.

Further, the present invention encompasses elements that employ an aspect of the present invention on only one of the inner active surface and the outer active surface. Thus, referring to FIG. 17B, an element 16' includes an active surface 31 that may form either the inner active surface or outer active surface. Active surface 31 is formed from an angularly variable radius if curvature r-c, and preferably forms a constant strut angle, as defined herein, with its corresponding race. An opposing active surface 33 preferably is not formed of an angularly variable radius of curvature, but rather preferably is formed having a true radius to form a segment of a circle. Thus, the race surface corresponding to active surface 33 may either have features to cause the strut angle to be constant (such as, for example, a cam surface—not shown in FIG. 17B—which will be understood by persons familiar with clutch design and technology in light of the present disclosure) with respect to roll angle or the strut angle may be variable.

Figure 17C:
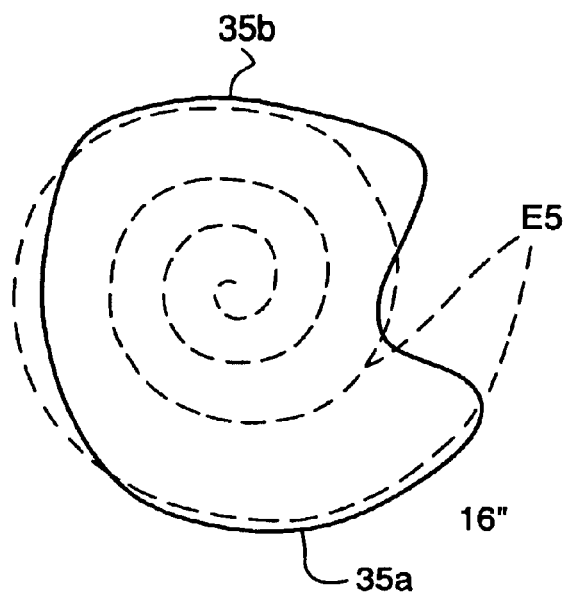
FIG. 17C is another diagram of other shapes capable of forming an element, according to another embodiment of the present invention.

FIG. 17C illustrates that an element 16" may be formed of a single equiangular spiral E5, which is shown in dashed lines superimposed over element 16". Thus, an inner active surface 35a and outer active surface 35b are formed on opposing sides of spiral E5.

Figure 19:
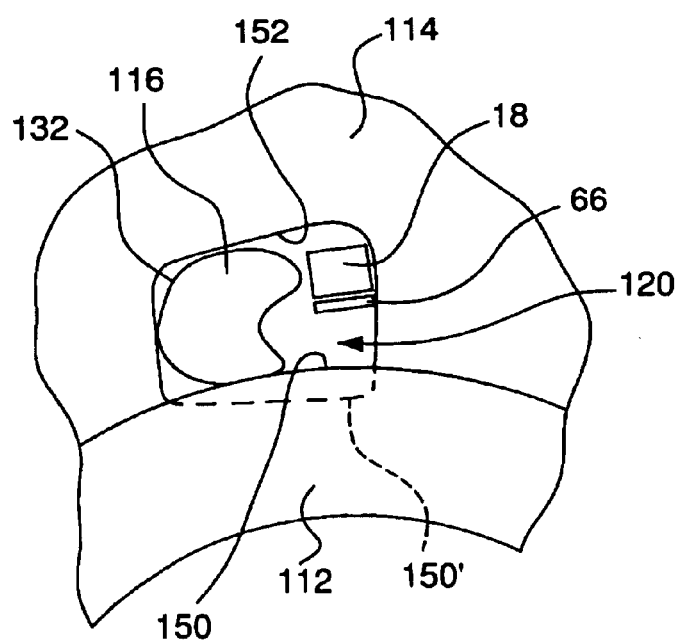
FIG. 19 is schematic view, similar to FIG. 12, of a portion of a clutch according to another embodiment.

The present invention encompasses structure other than elements 16, 16' and 16" that maintains constant strut angles during engagement. For example, FIG. 19 illustrates an alternative element 116 that is disposed between an inner race 112 and a pocket 120 in an outer race 114. Element 116 has an inner active surface that is as described above with respect to reference numeral 30. Inner race 150 is concentric, such that the inner active surface of element 116 forms a constant strut angle with respect to inner roll angle, as generally described above. An element outer active surface 132 contacts an outer race main surface or contact surface 152, which is not concentric with inner race 112, but rather has a cam shape. Also, element outer active surface 132 is cammed or non-circular (as oriented in the cross sectional view shown in FIG. 19), and surfaces 152 and 132 cooperate such that element 116 maintains a constant outer strut angle as element pivots or moves between a fully engaged and a fully disengaged position.

The cam-on-cam configuration of the outer surface may also be formed on the inner surface. Thus, an alternative inner race main surface or contact surface 150' is shown in dashed lines to indicate that it may be formed into such a cam surface. In order to maintain a substantially constant, inner strut angle for a pivoting element, the inner active surface of element 116 may cammed or non-circular similar to that described above with respect to outer active surface 132. The geometric configuration of surfaces 132 and 152 (and/or 150') will depend upon sizes of the components and design considerations of the particular application, and the geometric configuration for the particular application may be chosen by persons familiar with clutch technology and design in view of the present disclosure.

For the embodiment of clutch 10, inner race contact surface 50 and main outer race surface 52 (that is, the surfaces on which elements 16 wedge to transmit torque) define substantially concentric circles, such as, for example, as shown in FIG. 12. Thus, the curves defining the inner and outer elements active surfaces 30 and 32 may be defined by curves of increasing radii of curvature, such as the equiangular spiral, to form constant strut angles.

In addition to the enhanced uniformity of movement of the elements inherent in the present invention and other advantages described or inherent in the present invention and its embodiments, persons skilled in the air will recognize numerous additional benefits to the disclosed and other embodiments of present invention, such as, for example, the ability to employ powder metallurgy processes to form many of the clutch components. In this regard, conventional powder metallurgy tolerances for net shape forgings are often approximately +/−0.006 inches, which for many clutch components and applications is sufficient such that net shape forgings or near net shape forgings may be employed.

In fact, some or all of the components, including the elements 16 and races 12 and 14 may be net shape forgings within such tolerances while maintaining many of the advantages described herein. The choice of metal powder mix and related processing may vary according to the desired properties of the components, as will be understood by persons familiar with powder metallurgy technology and practice.

For some applications, for example, components may be formed by gas carburizing of a briquetted powder metal preform prior to hot forging to form a dense, carburized powdered metal part, which is commonly referred to as a SINTA-CARB™ process. Such technology is described in U.S. Pat. No. 3,992,763, entitled "Method Of Making Powdered Metal Parts," which is incorporated by reference herein in its entirety. The present invention also encompasses forming the components of other materials, such as, for example, forming the elements by cold or hot extrusion (which is preferred for some applications) or machining the inner and outer races by wrought steel.

Further, it has been found that the components may fall within tolerance ranges that are a function of the component size. In this regard, it is helpful to provide dimensional tolerance limits on the components in terms of inches per inch diameter of the relevant part. The dimensional tolerance for the surface 52 of the outer race preferably is no more that approximately 0.003 inches per inch of race diameter. The dimensional tolerance for the surface 50 of the inner race preferably is no more that approximately 0.00075 inches per inch of race diameter. The dimensional tolerance of elements 14 may be less than or equal to approximately 0.0005 inch per inch diameter of the largest circle that may be inscribed around the outside of the element.

Embodiments of the present invention have been described to illustrate various aspects of the present invention. The present invention, however, is not limited to the particular embodiments described herein, but rather encompasses all embodiments or aspects within the broad scope of the claims. For merely a few examples, pockets are described as being formed on the outer races even though the present invention encompasses pockets being formed on the inner races or races having no pockets; the present invention encompasses caged or phased elements as well as un-caged or unphased elements; the present invention encompasses employing structural or functional features from any one of the elements or embodiments in combination with structural or functional features from any other of the elements or embodiments; and other variations too numerous to mention but flowing naturally from the present disclosure.

We claim:

1. A clutch comprising:
   a substantially circular inner race;
   an outer race that is disposed about the inner race; and
   elements disposed between the inner race and the outer race, each one of the elements including:
      an inner active surface that is defined by a first angularly variable radius of curvature that increases with respect to roll angle at a first rate;
      an outer active surface, disposed opposite the inner active surface, that is defined by a second angularly variable radius of curvature that increase with respect to the roll angle at a second rate; wherein the inner active surface is defined by a first spiral and the second active surface is defined by a second equiangular spiral;
   whereby the inner active surface contacts the inner race and the outer active surface contacts the outer race to transmit torque therebetween while the elements are in an engaged position.

2. The clutch of claim 1 wherein each one of the elements include a pair of opposing intermediate surfaces disposed substantially between the inner active surface and the outer active surface.

3. The clutch of claim 1 wherein the outer race is substantially concentric with the inner race.

4. The clutch of claim 1 wherein each one of the elements is independent.

5. The clutch of claim 1 wherein the first increasing rate is the same as the second increasing rate.

6. The clutch of claim 1 wherein the first increasing rate is not equal to the second increasing rate.

7. The clutch of claim 1 wherein the first rate and second rate are constant.

8. The clutch of claim 1 wherein the inner active surface and the outer active surface share the same origin.

9. The clutch of claim 8 wherein a least one of the inner race and the outer race has pockets formed therein that house the elements.

10. The clutch of claim 8 wherein an inner strut angle of at least some of the elements changes no more than four degrees while the elements move between a freewheeling position and the engaged position.

11. The clutch of claim 8 wherein an outer strut angle of at least some of the elements changes no more than four degrees while the elements move between a freewheeling position and the engaged position.

12. The clutch of claim 8 wherein an inner strut angle and an outer strut angle of at least some of the elements change no more than four degrees while the elements move between a freewheeling position and the engaged position.

13. The clutch of claim 8 wherein the inner strut angles and the outer strut angles of essentially all of the elements change no more than four degrees, while the elements move between a freewheeling position and the engaged position under load induced component deflections.

14. The clutch of claim 8 wherein an inner strut angle of at least some of the elements changes no more than two degrees while the elements move between a freewheeling position and the engaged position.

15. The clutch of claim 8 wherein an outer strut angle of at least some of the elements changes no more than two degrees while the elements move between a freewheeling position and the engaged position.

16. The clutch of claim 8 wherein an inner strut angle and an outer strut angle of at least some of the elements change no more than two degrees while the elements move between a freewheeling position and the engaged position.

17. The clutch of claim 16 wherein the inner strut angles and the outer strut angles of essentially all of the elements change no more than two degrees, while the elements move between a freewheeling position and the engaged position under load induced component deflections.

18. The clutch of claim 8 wherein an inner strut angle of at least some of the elements changes no more than one degree while the elements move between a freewheeling position and the engaged position.

19. The clutch of claim 8 wherein an outer strut angle of at least some of the elements changes no more than one degree while the elements move between a freewheeling position and the engaged position.

20. The clutch of claim 8 wherein an inner strut angle and an outer strut angle of at least some of the elements change no more than one degree while the elements move between a freewheeling position and the engaged position.

21. The clutch of claim 20 wherein the inner strut angles and the outer strut angles of essentially all of the elements change no more than one degree, while the elements move between a freewheeling position and the engaged position under load induced component deflections.

22. The clutch of claim 8 wherein essentially all of the elements maintain an approximately constant inner strut angle and an approximately constant outer strut angle, while the elements move between a freewheeling position and the engaged position under load induced component deflections.

23. The clutch of claim 8 further comprising springs urging the elements toward the engaged position.

24. The clutch of claim 23 wherein the elements pivot, in response to urging by said springs, to take up a height dimension between the inner race and the outer race, whereby the angularly variable radius of curvature enables the elements take up said height dimension.

25. The clutch of claim 8 wherein the elements are formed by powder metallurgy.

26. The clutch of claim 8 wherein the elements are formed by cold or hot extrusion.

27. The clutch of claim 25 wherein each one of the inner race and the outer race are formed by powder metallurgy.

28. The clutch of claim 25 wherein each one of the inner race and the outer race is machined from wrought steel.

29. The clutch of claim 25 wherein each one of the inner race and the outer race is formed by gas carburizing of a briquetted powder metal preform prior to hot forging.

30. The clutch of claim 25 wherein the elements are net shape forgings.

31. The clutch of claim 27 wherein each one of the inner race, the outer race, and the elements are net shape forgings.

32. The clutch of claim 31 wherein dimensional tolerance of a diameter of the inner race contact surface is less than or equal to approximately 0.00075 inch per inch diameter of the inner race, dimensional tolerance of a diameter of the outer race contact surface is less than or equal to approximately 0.003 inch per inch diameter of the outer race, and dimensional tolerance of a diameter of the elements is less than or equal to approximately 0.0005 inch per inch diameter of the largest inscribed circle that the element can fit within.

33. The clutch of claim 1 wherein the inner active surface and the outer active surface are defined by opposing sides of a single equiangular spiral.

34. The clutch of claim 1 wherein the inner active surface and the outer active surface do not share the same origin.

35. A clutch comprising:
a substantially circular inner race;
an outer race that is disposed about the inner race; and
elements disposed between the inner race and the outer race, each one of the elements including:
an inner active surface that is defined by a first equiangular spiral;
an outer active surface, disposed opposite the inner active surface, that is defined by a second equiangular spiral; wherein the equiangular spirals share a single, common origin,
whereby the inner active surface contacts the inner race and the outer active surface contacts the outer race to transmit torque therebetween while the elements are in an engaged position, wherein the inner active surface is defined by a first spiral and the second active surface is defined by a second equiangular spiral.

36. A clutch comprising:
a substantially circular inner race;
an outer race that is disposed about the inner race; and
elements disposed between the inner race and the outer race, each one of the elements including:
an inner active surface that is defined by a first angularly variable radius of curvature that increases with respect to roll angle at a first rate;
an outer active surface, disposed opposite the inner active surface, that is defined by a second angularly variable radius of curvature that increase with respect to the roll angle at a second rate; and
springs urging the elements toward the engaged position;
wherein a rear portion of the elements contacts a portion of one of the inner race and the outer race such that the elements contact the inner race and the outer race at three points,
wherein the elements pivot, in response to urging by said springs, to take up a height dimension between the inner race and the outer race,
whereby the inner active surface contacts the inner race and the outer active surface contacts the outer race to transmit torque therebetween while the elements are in an engaged position and whereby the angularly variable radius of curvature enables the elements to take up said height dimension.

37. A clutch comprising:
a substantially circular inner race;
an outer race that is substantially concentric with the inner race, the outer race including plural pockets formed therein, each one of the pockets including an outer surface and a positioning surface, the outer surface being concentric with the inner race, a contact region of the outer surface being nonparallel to the positioning surface;

elements disposed at least partially within the pockets, the elements transmitting torque between the inner race and the outer race while the elements are in an engaged position, each one of the elements corresponding to one of the pockets and including:
- an inner active surface that is defined by a first angularly variable radius of curvature that increases with respect to roll angle at a first rate, the inner active surface contacting the inner race while the elements are in the engaged position;
- an outer active surface, disposed opposite the inner active surface, that is defined by a second angularly variable radius of curvature that increase with respect to the roll angle at a second rate, the outer active surface contacting the pocket outer surface contact region;
- a first intermediate surface coupled between the inner active surface and the outer active surface, the first intermediate surface capable of contacting the pocket positioning surface; and
- a second intermediate surface coupled between the inner active surface and the outer active surface opposite the first intermediate surface; and springs disposed at least partially in the pockets, the springs urging the elements toward the pocket positioning surface and urging the elements toward the engaged position, whereby contact between the element and each of the pocket outer surface and the pocket positioning surface enhances element positioning.

38. The clutch of claim 37 wherein the elements pivot, in response to urging by said springs, to take up a height dimension between the inner race and the outer race, whereby the angularly variable radius of curvature enables the elements take up said height dimension.

39. The clutch of claim 38 wherein a rear portion of the elements contacts a portion of one of the inner race and the outer race such that the elements contact the inner race and the outer race at three points.

40. The clutch of claim 37 wherein the springs urge the elements toward the engaged position such that the element inner active surfaces are in contact with the inner race during freewheeling, whereby each element contacts the outer race at two locations and contacts the inner race during free wheeling and while in the engaged position such that the elements are positioned to enhance engagement and disengagement.

41. The clutch of claim 37 wherein the outer race has inwardly extending legs the sides of which form the positioning surface and spring contact surface of adjacent pockets.

42. The clutch of claim 41 wherein the legs include pads on distal ends thereof for holding the inner race substantially concentric to the outer race.

43. The clutch of claim 37 wherein the element includes an extension proximate the first intermediate surface, the extension defining an apex against which the spring acts.

44. The clutch of claim 37 wherein a retainer holds the springs in place.

45. The clutch of claim 44 wherein the retainer includes fingers that extend into the pockets to retain the spring.

46. The clutch of claim 44 wherein the retainer consists of two snap rings that hold either end of the spring against the pocket outer surface.

47. The clutch of claim 44 wherein the retainer is a ribbon including windows formed therein, the legs being disposed through the windows.

48. The clutch of claim 47 further comprising ribs disposed between the windows, the ribs retaining the springs.

49. The clutch of claim 37 wherein the elements include an extension coupled between the inner active surface and the outer active surface, whereby the extension is capable of contacting the inner race to prevent the element from rotating out of position.

50. The clutch of claim 49 wherein the extension is disposed on a lower portion of the second intermediate surfaces and the spring urges against an upper portion of the second intermediate surface.

51. The clutch of claim 50 wherein the second intermediate surface includes a substantially planar landing against which the spring urges.

52. The clutch of claim 37 wherein the elements are formed by powder metallurgy.

53. The clutch in claim 37 wherein the elements are formed by cold or hot extrusion.

54. The clutch of claim 52 wherein each one of the inner race and the outer race are formed by powder metallurgy.

55. The clutch of claim 52 wherein each one of the inner race and the outer race is machined from wrought steel.

56. The clutch of claim 52 wherein each one of the inner race and the outer race is formed by gas carburizing of a briquetted powder metal preform prior to hot forging.

57. The clutch of claim 52 wherein the elements are net shape forgings.

58. The clutch of claim 54 wherein each one of the inner race, the outer race, and the elements are net shape forgings.

59. The clutch of claim 58 wherein dimensional tolerance of a diameter of the inner race contact surface is less than or equal to approximately 0.00075 inch per inch diameter of the inner race, dimensional tolerance of a diameter of the outer race contact surface is less than or equal to approximately 0.003 inch per inch diameter of the outer race, and dimensional tolerance of a diameter of the elements is less than or equal to approximately 0.0005 inch per inch diameter of the largest inscribed circle that the element can fit within.

60. The clutch of claim 37 wherein the outer race includes spring pockets formed therein, each one of the spring pockets being in communication with a corresponding one of the pockets, the springs being at least partially disposed in the spring pockets.

61. A clutch comprising:
- a substantially circular inner race;
- an outer race that is disposed about the inner race; and
- elements disposed between the inner race and the outer race, each one of the elements including an inner active surface contacting the inner race and an outer active surface, disposed opposite the inner active surface, contacting the outer race; one of the inner active surface and the outer active surface being defined by an angularly variable radius of curvature;
- wherein said one of the inner active surface and the outer active surface includes an origin, a radial vector extending from the origin to a surface point on a corresponding one of the inner active surface and the outer active surface, and an angle of tangency formed between the radial vector and a normal vector to a tangent to said one of the inner active surface and the outer active surface at said surface point, said angle of tangency being constant at every point on the surface of said one of the inner active surface and the outer active surface,
- whereby the elements transmit torque between the inner race and the outer race while the elements are in an engaged position.

62. The clutch of claim 61 wherein said one of the inner active surface and the outer active surface includes only one origin.

63. The clutch of claim 62 wherein an other one of the inner active surface and the outer active surface is defined by an angularly variable radius of curvature.

64. The clutch of claim 62 wherein said one of the inner active surface and the outer active surface is the inner active surface.

65. The clutch of claim 62 wherein said one of the inner active surface and the outer active surface is the outer active surface.

66. The clutch of claim 62 wherein said angle of tangency is constant with respect to the roll angle.

67. The clutch of claim 61 wherein said angle of tangency is constant with respect to the roll angle.

68. The clutch of claim 61 wherein said one of the inner active surface and the outer active surface defines a radius of curvature that varies with respect to roll angle at an increasing rate.

69. The clutch of claim 61 wherein the elements pivot, in response to urging by springs, to take up a height dimension between the inner race and the outer race, whereby the angularly variable radius of curvature enables the elements take up said height dimension.

70. The clutch of claim 61 wherein the element active surfaces do not share the same center point.

71. A clutch comprising:
a substantially circular inner race;
an outer race that is disposed about the inner race; and
elements disposed between the inner race and the outer race, each one of the elements including an inner active surface contacting the inner race and an outer active surface, disposed opposite the inner active surface, contacting the outer race; one of the inner active surface and the outer active surface being defined by an angularly variable radius of curvature; wherein the element active surfaces share the same center point,
whereby the elements transmit toque between the inner race and the outer race while the elements are in an engaged position.

72. A clutch comprising:
a substantially circular inner race;
an outer race that is disposed about the inner race; and
elements disposed between the inner race and the outer race, each one of the elements including an inner active surface contacting the inner race and an outer active surface, disposed opposite the inner active surface, contacting the outer race; one of the inner active surface and the outer active surface being defined by an angularly variable radius of curvature;
wherein the elements pivot, in response to urging by springs, to take up a height dimension between the inner race and the outer race, whereby the angularly variable radius of curvature enables the elements take up said height dimension, and
wherein a rear portion of the elements contacts a portion of one of the inner race and the outer race such that the elements contact the inner race and the outer race at three points,
whereby the elements transmit torque between the inner race and the outer race while the elements are in an engaged position.

73. A clutch comprising:
an inner race including a substantially circular contact surface;
an outer race including a substantially circular contact surface that is disposed about the inner race; and
elements disposed between the inner race and the outer race, each one of the elements including: (i) an inner active surface contacting the inner race contact surface and (ii) an outer active surface, disposed opposite the inner active surface, contacting the outer race contact surface; and
means for maintaining a constant strut angle as the elements roll from an engaged to a disengaged position, wherein said means comprise plural elements having an inner active surface and an opposing active surface, at least one of the inner active surface and the outer active surface being formed by an equiangular spiral;
whereby the elements transmit torque between the inner race and the outer race while the elements are in an engaged position.

74. The clutch of claim 73 wherein the outer active surface is formed by a second equiangular spiral.

75. A clutch comprising:
an inner race including a substantially circular contact surface;
an outer race including a substantially circular contact surface that is disposed about the inner race; and
elements disposed between the inner race and the outer race, each one of the elements including: (i) an inner active surface contacting the inner race contact surface and (ii) an outer active surface disposed opposite the inner active surface, contacting the outer race contact surface; and
means for maintaining a constant strut angle as the elements roll from an engaged to a disengaged position, wherein said means comprise plural elements having an inner active surface and an opposing active surface, the inner active surface being formed by a first equiangular spiral;
whereby the elements transmit torque between the inner race and the outer race while the elements are in an engaged position.

76. The clutch of claim 75 wherein the outer active surface is formed by a second equiangular spiral.

77. The clutch of claim 75 wherein said outer active surface is not formed by an equiangular spiral.

78. A clutch comprising:
an inner race including a substantially circular contact surface;
an outer race including a substantially circular contact surface that is disposed about the inner race; and
elements disposed between the inner race and the outer race, each one of the elements including: (i) an inner active surface contacting the inner race contact surface and (ii) an outer active surface, disposed opposite the inner active surface, contacting the outer race contact surface; and
means for maintaining a constant strut angle as the elements roll from an engaged to a disengaged position, wherein said means comprise plural elements having said inner active surface and said opposing active surface, the outer active surface being formed by an equiangular spiral;
whereby the elements transmit torque between the inner race and the outer race while the elements are in an engaged position.

79. The clutch of claim 78 wherein the inner active surface is not formed by an equiangular spiral.

80. A clutch comprising:

an inner race including a substantially circular contact surface;

an outer race including a substantially circular contact surface that is disposed about the inner race; and elements disposed between the inner race and the outer race, each one of the elements including: (i) an inner active surface contacting the inner race contact surface and (ii) an outer active surface, disposed opposite the inner active surface, contacting the outer race contact surface; and means for maintaining a substantially constant strut angle as the elements roll from an engaged to a disengaged position, wherein means comprises a cam surface formed on the outer race and the element outer active surface is non-circular, whereby interaction of the cam surface and the outer active surface maintains the substantially constant strut angle;

whereby the elements transmit torque between the inner race and the outer race while the elements are in an engaged position.

81. A clutch comprising:

an inner race including a substantially circular contact surface;

an outer race including a substantially circular contact surface that is disposed about the inner race; and elements disposed between the inner race and the outer race, each one of the elements including: (i) an inner active surface contacting the inner race contact surface and (ii) an outer active surface, disposed opposite the inner active surface, contacting the outer race contact surface; and means for maintaining a substantially constant strut angle as the elements roll from an engaged to a disengaged position, wherein said means comprises a cam surface formed on the inner race and the element inner active surface is non-circular, whereby interaction of the cam surface and the inner active surface maintains the substantially constant strut angle;

whereby the elements transmit torque between the inner race and the outer race while the elements are in an engaged position.

82. Plural elements for transmitting torque between races in a clutch, said elements comprising:

an inner active surface forming a contact region thereon, wherein the inner active surface is defined by an equiangular spiral;

an outer active surface, disposed opposite the inner active surface, forming a contact region thereon; and at least one of the inner active surface and the outer active surface being defined by an angularly variable radius of curvature of that increases with respect to roll angle.

83. Plural elements for transmitting torque between races in a clutch, said elements comprising:

an inner active surface forming a contact region thereon;

an outer active surface, disposed opposite the inner active surface, forming a contact region thereon, wherein the outer active surface is defined by an equiangular spiral; and at least one of the inner active surface and the outer active surface being defined by an angularly variable radius of curvature of that increases with respect to roll angle.

84. Plural elements for transmitting torque between races in a clutch, said elements comprising:

an inner active surface forming a contact region thereon;

an outer active surface, disposed opposite the inner active surface, forming a contact region thereon; and at least one of the inner active surface and the outer active surface being defined by an angularly variable radius of curvature of that increases with respect to roll angle, wherein said at least one of the inner active surface and the outer active surface forms a tangent line at a surface point thereof, the radius of curvature being perpendicular to the tangent line, an angle of tangency being formed the radius of curvature and a radial vector between an origin and the surface point, the angle of tangency being constant with respect to roll angle over substantially all of the surface of said at least one of the inner active surface and the outer active surface.

85. The elements of claim 84 wherein said at least one of the inner active surface and the outer active surface is the inner active surface.

86. The elements of claim 84 wherein said at least one of the inner active surface and the outer active surface is the inner active surface.

87. The elements of claim 84 wherein the elements pivot toward an engagement position in response to urging by springs.

88. The elements of claim 87 wherein the angularly variable radius of curvature enables a variable engagement dimension such that said pivoting positions the elements into contact with the races, whereby the engagement dimension is measured between contact points of the elements.

* * * * *